April 7, 1959 A. W. BLOW ET AL 2,881,250
MONITORING INDICATION FOR COMMUNICATION SYSTEM
Filed Nov. 2, 1956
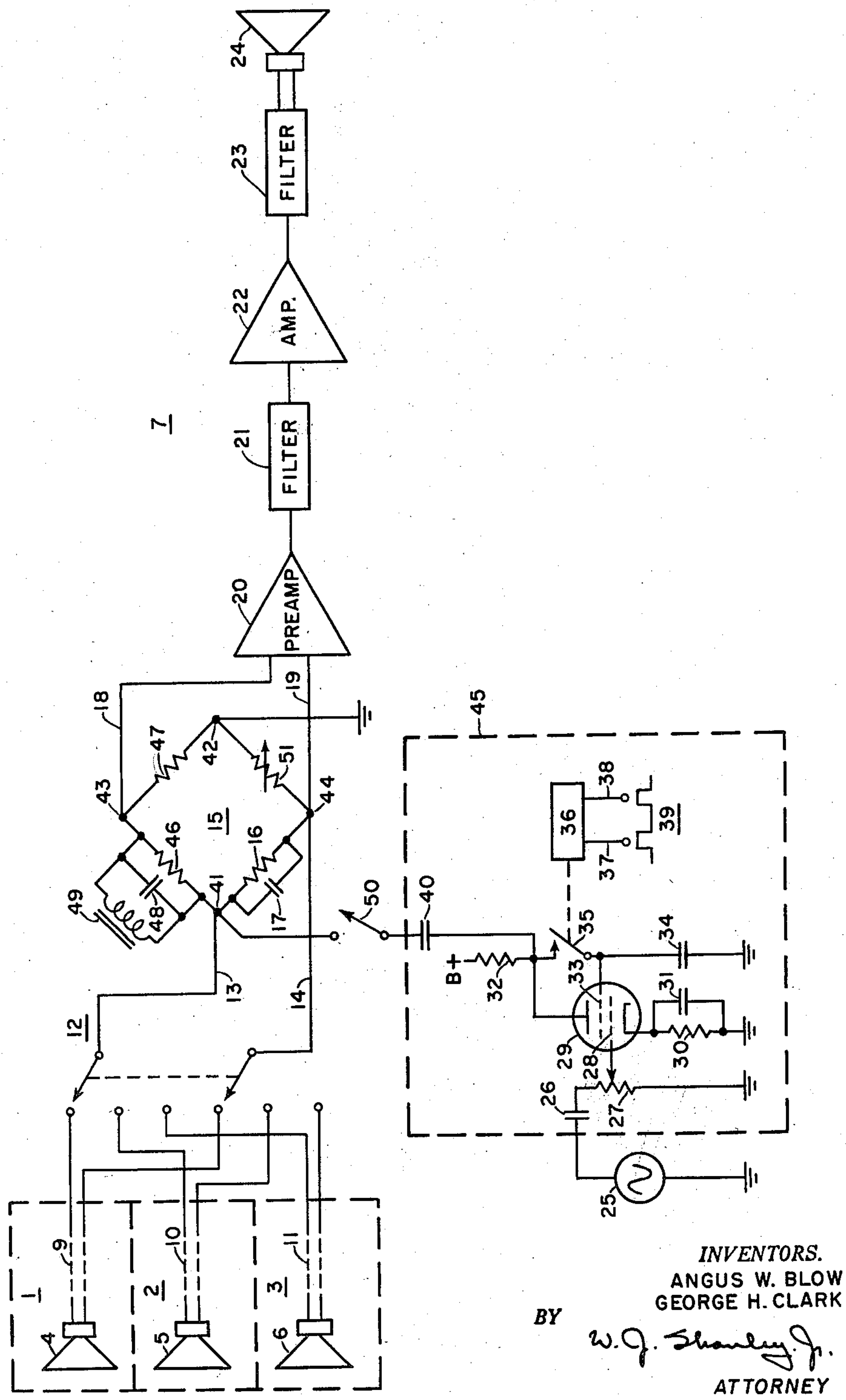
INVENTORS.
ANGUS W. BLOW
GEORGE H. CLARK
BY W. J. Shanley Jr.
ATTORNEY United States Patent Office 2,881,250
Patented Apr. 7, 1959

2,881,250

MONITORING INDICATION FOR COMMUNICATION SYSTEM

Angus W. Blow and George H. Clark, Rochester, N.Y., assignors to General Dynamics Corporation, Rochester, N.Y., a corporation of Delaware Application November 2, 1956, Serial No. 620,091
12 Claims. (Cl. 179—1)

Our invention pertains to intercommunication systems, and more particularly to intercommunicating systems of the loudspeaker type having provisions to automatically warn a person in the vicinity of a remote station employing transducing devices capable of being utilized both as microphones and loudspeakers, when the transducing device is monitoring conversations at the station.

In the loudspeaking intercommunicating systems of the prior art having a communication direction control switch under the control of the master station, there is no assurance to the person at the remote station that his activity in proximity to the bi-directional transducing device is not being monitored by a person at the master station. Some systems of the prior art utilize privacy switches at the remote speakers, thereby assuring complete privacy. Such systems have the disadvantage of requiring a privacy switch at each remote station and they also require constant attention as to the position of the switch to assure privacy. Since the amplifiers are usually situated at the master station, the use of a privacy switch at the remote speaker also necessitates the running of an extra conductor between each remote station and the master station to control the switching of the amplifier.

Another system that has been suggested for providing a privacy feature is a system utilizing the application of a warning tone to the remote speaker whenever the communication direction control switch at the master station is indexed to the "Listen" position. With this arrangement, whenever the remote speaker is connected to the input of the amplifier at the master station, thereby allowing reception of signals by the master station from the selected remote station, a warning tone is simultaneously applied to the remote speaker, thereby emitting an audible warning. Such a tone serves as a convenient way of indicating that the particular speaker is being monitored by a person at the master station. Since the warning tone is being applied to the loudspeaker at the same time it is serving as an input to the amplifier, there must be an arrangement to separate or prevent the warning tone from being fed with the signals from the selected speaker position to the amplifier and loudspeaker at the master station. The prior art systems utilized low pass filter circuits which clocked the high frequency tone signals but passed the lower range voice signals. These filters were interposed between the output of the oscillator and the input of the master station amplifier. A disadvantage of this type of circuit arose because of the difficulty of finding a filter circuit capable of attenuating the tone signal applied to the amplifier output, sufficiently without creating other problems.

For example, these filters had to be able to attenuate the tone signals until they were approximately 40 db below the voice signals in order to have an intelligible signal at the master station. This requirement was difficult to meet when you consider that the tone signal was of the order of 1 volt, while the normal maximum voice signal applied to the filter might be of the order of .001 volt. This meant that the voice signals would be 60 db. below the tone signal at the filter input and had to be 40 db above it at the output of the filter. Thus, the minimum attenuation required might be in the order of 100 db assuming there would be no insertion losses of the voice signals occasioned by the filter. However, since there is such a loss which is of the order of 25 db's, the filter must be able to attenuate the tone signals an additional 25 db in order to adjust their relative values. It was therefore necessary to have a filter capable of attenuating the tone signal approximately 125 db for minimum operation.

An LC filter of such a size results in extensive shielding problems which makes the filter that much more costly, assuming that the shielding can reduce the radiation to a tolerable point. If shielding doesn't solve the problem, then the filters have to be physically removed from the main chassis and placed in a more remote position.

The above figures on the attenuation by the filter, which are merely exemplary, would result in a filter in which the tone signals would be reduced to 40 db below the voice signals but it ignored the question of the absolute value of the voice signal strength. This value is important when considering the question of the tube noise and microphonics since weak signals from the more distant rooms would be lost in the noise or microphonics.

Another factor present is that the filter be capable of attenuating the tone signal in order to prevent it from overdriving the amplifier input and completely blocking it.

These many factors presented a formidable design problem when it came to providing a commercially practical filter that would operate satisfactorily.

It is therefore an object of the present invention to provide an improved loudspeaking intercommunicating system in which the person in the vicinity of the remote station is automatically warned that he is being monitored.

It is another object of this invention to provide a more effective filtering system for filtering out a warning tone from the input of the master station amplifier.

It is a further object to provide a warning tone arrangement according to the invention having a distinctive warning tone which is more noticeable without increasing the volume of the tone to such an extent as to make the occupants of the room of the remote station uncomfortable.

According to our invention, the warning tone signal is applied across one diagonal of a bridge circuit while the input to the remote speakers is connected across one leg of the bridge. The input of the amplifier feeding the master station speaker is connected across the other diagonal of the bridge. Provisions are made for balancing the bridge at the frequency of the warning tone oscillator, thereby effectively filtering the warning tone which was applied across one diagonal from the input to the master station speaker amplifier which was connected across the opposite diagonal. However, since the remote speakers are connected across one leg of the bridge, and consequently the bridge is not balanced with respect thereto, the warning tone will be applied to the remote speakers. Since the remote speakers are also acting as a microphone at the same time the warning tone is being produced by the speaker, the voice signals or any signal applied to the loudspeaker will be applied across the same leg and will be in turn reproduced across the diagonal serving as the input to the master station amplifier. In this way, any signal being picked up by the remote speaker when acting as a microphone will be passed by the bridge circuit, and reproduced at the master station speaker. At the same time, the bridge circuit will serve to allow the application of the warning tone to the remote speakers while blocking its entry to the amplifier.

Since the bridge circuit may be feeding the remote speakers through different length lines, depending upon which speakers are selected, variable loading of the bridge may occur due to the different distributed capacities of the lines selected. In order to minimize the effect of these variations in loading due to the shunt capacity presented by the varying length lines, the bridge circuit is artificially loaded with a compensating impedance connected across the same leg that feeds the remote speakers. By increasing the total impedance loading of the bridge due to both sources of impedance loading, any change due to the selection of various length lines may be made proportionately smaller and will effectively not disturb the balance of the bridge upon changing the station selected.

Further objects and advantages of our invention will become apparent as the following description proceeds, and the features of novelty which characterize our invention will be pointed out with particularity in the claims annexed to and forming a part of this specification.

For a better understanding of our invention, reference may be had to the accompanying drawing in which the single figure shows a schematic of the preferred embodiment of our invention.

Referring now to the drawing, there is illustrated three remote stations indicated generally at 1, 2, and 3. There is situated at each said station a transducer or bi-directional loudspeaker numbered respectively 4, 5, and 6. Speakers 1–3 are connected to the equipment at the master station indicated generally at 7, through conductors 9, 10, and 11 which may be of variable length and which terminate at the central station on the contacts of station selector switch 12. When selector switch 12 is in the position indicated in the drawing, remote station 1 will be selected and any audible signals in proximity to speaker 4 will generate electrical energy to be applied over conductor 9 through the contacts of switch 12 to conductors 13 and 14. These conductors apply the output energy of the selected speaker across one leg of bridge 15. Therefore, the voltage induced in loudspeaker 4 is applied across resistance 16 and the compensating capacitor 17, to be later referred to in detail, which form the leg of the bridge circuit between points 41 and 44. This signal will be reproduced across that diagonal of the bridge connected to conductors 18 and 19 which in turn feed preamplifier 20, filter 21, amplifier 22, filter 23, and the master station loudspeaker 24. Therefore, since the bridge is not balanced for the audible frequency input signals applied across the leg between points 41 and 44 and the output signals across the diagonal connected to conductors 18 and 19, the signal produced by speaker 4 will be in turn reproduced by loudspeaker 24 after being amplified by amplifiers 20 and 22.

The drawing also illustrates audio-oscillator 25, which provides a 5 kc. signal to be used as a warning tone. This signal is applied to the input of keying circuit 45 through coupling condenser 26. The signal is therefore applied across potentiometer 27 and is fed to grid 28 of tube 29 through its movable arm. Potentiometer 27 provides a volume control which is adjustable in order to provide a warning tone of desired level at the remote speakers. The cathode of tube 29 is connected to ground through an RC bias network composed of resistance 30 and capacitor 31. The plate of tube 29 obtains its operating potential through resistor 32. The screen grid 33 is connected to ground through capacitor 34 and is also connected through relay operated switch 35 to the plate of tube 29. Relay 36 which operates switch 35 may be suitably energized over conductors 37 and 38 by pulses of the waveform indicated at 39. Relay 36 thus opens and closes contacts 35, thereby amplitude modulating the constant frequency signal from the oscillator 25. More in detail, tube 29 is biased for Class A operation by the cathode bias arrangement, assuming a screen grid voltage equal to the average screen grid voltage during the pulsing of relay 36. When switch 35 is closed, capacitor 34 starts to charge through resistance 32 to a value equal to the plate voltage on tube 29. Because of the RC time constant, this variation is gradual and follows a generally trapezoidal pattern due to the opening and closing of switch 35. When the screen voltage of tube 29 reaches a point at which the tube is no longer cut off, then the audio tone being applied to grid 28 will be reproduced in the plate circuit and coupled to the bridge circuit through coupling condenser 40. This variable amplitude warning tone reproduced in the output circuit of tube 29 may be selectively applied to the bridge circuit across the diagonal from points 41 to 42 through switch 50. This switch provides a means to selectively apply the warning tone to bridge 15 when such is desired, as will be dealt with in more detail hereinafter.

Resistances 46 and 47 are equal in value to resistance 16 while capacitor 48 and choke coil 49 are respectively equal in value to capacitor 17 and the inductance of an average loudspeaker that might be selected by selector switch 12.

Bridge 15 is balanced at the frequency of the audio frequency source 25 by variable resistance 51 which is adjusted until the warning tone signal reproduced by loudspeaker 24 is at a minimum. At this point, the bridge will be balanced and the audio tone produced between points 41 and 42, that is, one diagonal of the bridge, will be balanced out across points 43 and 44, which is the other diagonal of the bridge. The voltage across this other diagonal is applied through conductors 18 and 19 to the preamplifier 20 and in turn through a low pass filter 21 which is tuned to pass frequencies below the frequency of tone generator 25. The output of this filter is in turn applied to the input of amplifier 22 which feeds another low pass filter 23 connected across the input of master station speaker 24.

It thus may be seen that the audible warning tone applied across one diagonal of the bridge is balanced out or considerably attenuated, before application to the amplifying channel feeding speaker 24 but it is applied substantially undiminished to the remote speaker, such as speaker 4, being monitored.

Since the rooms being fed by the remote speakers may be at different distances from the master station 7, the conductors which feed the remote speakers may be of different lengths. Since paired conductors have a certain distributed capacity per lineal foot, these different length lines which may be connected across the leg between points 41 and 44 through the operation of selector switch 12 may result in variable loading of the bridge circuit across that leg, and consequently may make it difficult to keep the bridge in balance. Thus to keep the bridge in balance would require its rebalancing upon each selection of a different station.

According to applicants' invention, therefore, the leg of bridge 15 connected between conductors 13 and 14 is artificially loaded by the insertion of a compensating impedance such as capacitor 17 across resistance 16. Prior to the insertion of capacitor 17, the range of variation due to the length of line feeding the most remote station compared with the length of line feeding the nearest station could be in the order of 100 to 1. By selecting capacitor 17 to be of such a value as to equal the capacity of the average line that can be selected by selector switch 12, the variation may then be reduced to the order of 3 to 1.

However, if the value selected for capacitor 17 equalled the capacity of the longest line the ratio would be of the order of 2 to 1. It is therefore apparent that it would be much easier to keep the bridge balanced when the variation was in the order of 2 or 3 to 1 instead of the range found prior to the artificial loading of the bridge circuit.

For example, the normal distributing capacity of a shielded wire is .0001 microfarad per foot. Therefore, if you had a system in which the nearest station was 10 feet removed from the master station and the farthest station was 1000 feet removed, the distributed capacity would then vary from .001 microfarad for the short line, to .1 microfarad for the long line. This range of variation is in the order of 100 to 1. If the average length line of the system is assumed to be approximately 500 feet, then the distributed capacity of such a length of shielded wire would be in the order of .05 microfarad and if such a capacity were inserted across resistor 16 as capacitor 17, thereby artificially loading the line, the range of variation from the short line to the long line would then be in the order of 3 to 1 instead of the range of variation of 100 to 1 that existed prior to the artificial loading of the bridge. If, however, it is felt that the power can be sacrificed to such an extent that the bridge may be loaded with a capacity equal to that of the longest line, then the variation may be reduced to the order of 2 to 1. By reducing the range of variations from the short length line to the long line, it is possible to balance the bridge when the medium length line or average length line is selected, and thereby not have to rebalance the bridge for each station selected.

It is also possible, instead of using just one capacitor such as capacitor 17, to individually load each line at a point beyond the selector switch so that the capacity presented to the bridge circuit could then be so adjusted that it always presented substantially the same loading, no matter what station is selected. It therefore would depend upon the requirements of the system and the differences in distances that the stations were removed from the master station, whether you selected the method of artificial loading illustrated in the drawings, or whether it was necessary to load each line individually.

As was previously pointed out, speakers 4, 5, 6, and 24 are capable of acting as bi-directional transducers. In the drawing, they are connected in the intercommunication system in such a manner that transducers 4, 5, and 6 will be acting as a microphone with respect to the signals sensed at their stations, while transducer 24 will be operating as a loudspeaker which will reproduce said signals. For purposes of clarity, applicants have not illustrated the circuit details necessary for using transducers 4, 5, and 6 as loudspeakers for reproducing signals sensed by transducer 24 when it is acting as a microphone. However, it will be obvious to those skilled in the art that switching circuits may be provided for enabling bi-directional operation of the system in accordance with well-known circuits utilizing a communication direction control switch. If a communication control switch is incorporated in the system, switch 50 may be ganged with it in such a way as to provide a suitable warning that a selected one of the bi-directional transducers is energized to act as a microphone.

While we have shown and described a specific embodiment of our invention, other modifications will readily occur to those skilled in the art. We do not, therefore, desire our invention to be limited to the specific arrangement shown and described, and we intend in the appended claims to cover all modifications within the spirit and scope of our invention.

We claim:

1. In an intercommunicating system, the combination including, first transducing means for converting electrical to acoustical signals and acoustical to electrical signals, a bridge circuit, means for coupling electrical signals between said first transducing means and one leg of said bridge circuit, a source of audio frequency electrical signals, means for coupling the output of said source across one diagonal of said bridge circuit, said bridge circuit including means for balancing said bridge at the frequency of said source, second transducing means for converting electrical to acoustical signals, and means for coupling the electrical signal developed across the diagonal opposite from said one diagonal to said second transducing means, the impedance of said first transducing means remaining substantially constant when said first transducing means is operating as an acoustical-to-electrical transducer whereby the bridge remains balanced to signals coupled across said one diagonal from said source thereby excluding said source signals from said second transducing means while permitting the application of the same signal to said first transducing means as a warning signal.

2. In an intercommunicating system, the combination including, first transducing means for converting electrical to acoustical energy and acoustical to electrical energy, a bridge circuit, means for connecting said first transducing means in parallel with one leg of said bridge circuit, a source of audio frequency signal energy, means for coupling the output of said source across one diagonal of said bridge circuit, second transducing means for converting electrical to acoustical energy, filter means for attenuating signal energy of the frequency generated by said source, means for balancing said bridge circuit at the frequency of said source, means for coupling signal energy developed across the diagonal opposite from said one diagonal to said filter means, and means for coupling the output energy of said filter means to said second transducing means, said first transducing means presenting a substantially constant impedance across said one leg of said bridge circuit during the time said first transducer is operating as a microphone whereby the signal of said source is applied to said first transducer but is blocked from said second transducer at the same time as said first transducer is generating signals that are applied to said second transducer for reproduction.

3. In an intercommunicating system, the combination including, first transducing means for converting electrical to acoustical energy and acoustical to electrical energy, said first transducing means being a fixed reactance impedance, a bridge circuit, first means for coupling electrical energy between said first transducing means and one leg of said bridge circuit, a source of audio frequency signal energy, second means for coupling the output of said source across one diagonal of said bridge circuit, second transducing means for converting electrical to acoustical energy, filter means for attenuating signal energy of the frequency generated by said source, means for balancing said bridge circuit at the frequency of said source, third means for coupling signal energy developed across the diagonal opposite from said one diagonal to said filter means, said third coupling means incuding means to amplify said signal energy, and fourth means for coupling the output energy of said filter means to said second transducing means.

4. In an intercommunicating system, the combination including, first transducing means for converting electrical to acoustical energy and acoustical to electrical energy, said first transducing means being a fixed reactance impedance, a bridge circuit, means for coupling electrical energy between said first transducing means and one leg of said bridge circuit, a source of audio frequency signal energy, said source including means to cyclically vary the amplitude of the signal energy without introducing transient signal energy, means for coupling the output of said source across one diagonal of said bridge circuit, second transducing means for converting electrical to acoustical energy, filter means for attenuating signal energy of the frequency generated by said source, means for balancing said bridge circuit at the frequency of said source when said first transducing means is coupled to said one leg of said bridge circuit, means for coupling signal energy developed across the diagonal opposite from said one diagonal to said filter means, and means for coupling the output energy of said filter means to said second transducing means.

5. In an intercommunicating system, the combination including, first transducing means for converting electrical to acoustical energy and acoustical to electrical energy, said first transducing means being a fixed reactance impedance, a bridge circuit, first means for connecting said first transducing means in parallel with one leg of said bridge circuit, a source of audio frequency signal energy, second means for coupling the output of said source across one diagonal of said bridge circuit, second transducing means for converting electrical to acoustical energy, means for balancing said bridge circuit at the frequency of said source when said first transducing means is connected in parallel with said one leg of said bridge circuit, means for amplifying signal energy, filter means for attenuating signal energy of the frequency generated by said source, third means for coupling signal energy developed across the diagonal opposite from said one diagonal to said second transducing means, said third coupling means including said amplifying means and said filter means coupled in cascade in the order named 6. In an intercommunicating system, the combination including, first transducing means for converting electrical to acoustical energy and acoustical to electrical energy, said first transducing means being a fixed reactance impedance, a bridge circuit, first means for coupling electrical energy between said first transducing means and one leg of said bridge circuit, a source of audio frequency signal energy of a frequency above the frequency of the signal energy generated by said first transducing means and applied by said first coupling means to said one leg of said bridge circuit, second means for coupling the output of said source across one diagonal of said bridge circuit, second transducing means for converting electrical to acoustical energy, filter means for attenuating signal energy of the frequency generated by said source, means for balancing said bridge circuit at the frequency of said source, third means for coupling signal energy developed across the diagonal opposite from said one diagonal to said filter means, and means for coupling the output energy of said filter means to said second transducing means.

7. In an intercommunicating system, the combination including, first transducing means for simultaneously converting electrical to acoustical energy and acoustical to electrical energy, said first transducing means being a fixed reactance impedance, a bridge circuit, first means for coupling electrical energy between said first transducing means and one leg of said bridge circuit, a source of audio frequency signal energy of a frequency above the frequency of the signal energy passed by said first coupling means to said one leg of said bridge circuit, second means for coupling the output of said source across one diagonal of said bridge circuit, second transducing means for converting electrical to acoustical energy, filter means for attenuating signal energy of the frequency generated by said source, means for balancing said bridge circuit at the frequency of said source when said first transducing means is coupled to said one leg, third means for coupling signal energy developed across the diagonal opposite from said one diagonal to said filter means, said third coupling means including means to amplify said signal energy, and fourth means for coupling the output energy of said filter means to said second transducing means.

8. In an intercommunicating system, the combination including, first transducing means for converting electrical to acoustical energy and acoustical to electrical energy, said first transducing means being a fixed reactance impedance, a bridge circuit, first means for coupling electrical energy between said first transducing means and one leg of said bridge circuit, a source of audio frequency signal energy, said source including means to cyclically vary the amplitude of the signal energy without introducing transient signal energy, second means for coupling the output of said source across one diagonal of said bridge circuit, second transducing means for converting electrical to acoustical energy, means for amplifying signal energy, filter means for attenuating signal energy of the frequency generated by said source, means for balancing said bridge circuit at the frequency of said source when said first transducing means is coupled to said one leg, third means for coupling signal energy developed across the diagonal opposite from said one diagonal to said second transducing means, said third coupling means including said amplifying means and said filter means cascade connected in the order named.

9. In an intercommunicating system, the combination including a bridge circuit, a source of electrical signals having a predetermined frequency, first means for coupling said signals to one diagonal of said bridge circuit, a plurality of means for utilizing said signals, said utilizing means including electro-acoustic transducing means, second means for selectively coupling said signals to said utilizing means from across one leg of said bridge circuit, said second coupling means constituting a loading impedance across said one leg of said bridge circuit and having a range of variation in impedance according to the utilizing means selected, a compensating impedance for the loading impedance presented by said second coupling means, said compensating impedance being coupled across said one leg, means for balancing said bridge circuit at said frequency, and second signal utilization means coupled to the bridge diagonal opposite to said one diagonal.

10. In an intercommunicating system, the combination including a bridge circuit, a source of electrical signals having a predetermined frequency, first means for coupling said signals to one diagonal of said bridge circuit, a plurality of means for utilizing said signals, second means for selectively coupling said signals to said utilizing means from across one leg of said bridge circuit, said second coupling means constituting a capacitive reactance load impedance across said one leg of said bridge circuit and having a range of variation in reactance according to the utilizing means selected, a capacitive reactance compensating impedance for said loading impedance presented by said second coupling means, said compensating impedance being coupled across said one leg, means for balancing said bridge circuit at said frequency, and second signal utilization means coupled to the bridge diagonal opposite to said one diagonal.

11. In an intercommunicating system, the combination including a bridge circuit, a source of electrical signals having a predetermined frequency, first means for coupling said signals to one diagonal of said bridge circuit, a plurality of means for utilizing said signals, means for selectively connecting said utilizing means across one leg of said bridge circuit, said selectively connecting means presenting a capacitive reactance load impedance across said one leg of said bridge circuit and having a range of variation in reactance, a capacitive reactance compensating impedance having a value at said frequency equal to the average value of the loading impedance presented by said selectively connecting means, said compensating impedance being coupled across said one leg, means for balancing said bridge circuit at said frequency, and second signal utilization means coupled to the bridge diagonal opposite to said one diagonal.

12. In an intercommunicating system, the combination including a bridge circuit, a source of electrical signals having a predetermined audio frequency, first means for coupling said signals to one diagonal of said bridge circuit, a plurality of means for utilizing said signals, said utilizing means including electro-acoustic transducing means, means for selectively connecting said utilizing means in parallel with one leg of said bridge circuit, said selectively connecting means constituting a capacitive reactance load impedance across said one leg of said bridge circuit and having a range of variation in reactance, a capacitive reactance compensating impedance having a value at said frequency equal to the average value of the loading impedance presented by said selectively connecting means, said compensating impedance being connected in parallel with said one leg, means for balancing said bridge circuit at said frequency, and second signal utilization means coupled to the bridge diagonal opposite to said one diagonal, said second signal utilization means including electro-acoustic transducing means.

References Cited in the file of this patent

UNITED STATES PATENTS 2,601,474 Van Zelst ---------------- June 24, 1952